United States Patent
Martinez De La Cruz et al.

(10) Patent No.: US 12,192,182 B2
(45) Date of Patent: Jan. 7, 2025

(54) CONTAINER WITH ENCRYPTED SOFTWARE PACKAGES

(71) Applicant: Telefonaktiebolaget LM Ericsson (publ), Stockholm (SE)

(72) Inventors: Pablo Martinez De La Cruz, Madrid (ES); Miguel Angel Garcia Martin, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 203 days.

(21) Appl. No.: 17/794,401

(22) PCT Filed: Apr. 3, 2020

(86) PCT No.: PCT/EP2020/059585
§ 371 (c)(1),
(2) Date: Jul. 21, 2022

(87) PCT Pub. No.: WO2021/148144
PCT Pub. Date: Jul. 29, 2021

(65) Prior Publication Data
US 2023/0050944 A1    Feb. 16, 2023

(30) Foreign Application Priority Data
Jan. 22, 2020   (EP) .................................... 20382032

(51) Int. Cl.
*H04L 29/06*     (2006.01)
*H04L 9/40*      (2022.01)

(52) U.S. Cl.
CPC ...... *H04L 63/0435* (2013.01); *H04L 63/0838* (2013.01)

(58) Field of Classification Search
CPC ...... G06F 21/60; G06F 21/602; G06F 21/604; G06F 21/62; G06F 21/6209;
(Continued)

(56) References Cited

U.S. PATENT DOCUMENTS

| | | | |
|---|---|---|---|
| 11,586,752 B1* | 2/2023 | Ozarkar | .................. H04L 9/083 |
| 2006/0171535 A1* | 8/2006 | Omae | ................ H04N 21/2347 |
| | | | 348/E7.056 |

(Continued)

FOREIGN PATENT DOCUMENTS

EP    3 267 351 A1    1/2018

OTHER PUBLICATIONS

International Search Report and Written Opinion dated Sep. 22, 2020 in International Application No. PCT/EP2020/059585 (17 pages).

(Continued)

*Primary Examiner* — Malcolm Cribbs
(74) *Attorney, Agent, or Firm* — Rothwell, Figg, Ernst & Manbeck, P.C.

(57) ABSTRACT

The invention relates to a method for operating a container (100) providing a service to a user in a cloud environment, wherein the container is generated from a container image (51) which comprises an encrypted software package, the container image further comprising a decryption entity, wherein the method comprises the steps of receiving a message to set up the container (100) out of the container image (51), the message comprising an access identifier allowing access to a restricted area (60) to which the access is not provided without the access identifier, the restricted area comprising a plurality of decryption keys, and accessing the restricted area (60) using the access identifier received with the message, and retrieving a decryption key from the restricted area (60) based on the access identifier, and decrypting the encrypted software package with the retrieved decryption key in order to generate a decrypted software package, providing the service to the user based on the decrypted software package.

20 Claims, 10 Drawing Sheets

(58) Field of Classification Search
CPC ............. G06F 21/6218; H04L 63/0435; H04L 63/0838; H04L 63/10; H04L 63/20
See application file for complete search history.

(56) References Cited

U.S. PATENT DOCUMENTS

| | | | |
|---|---|---|---|
| 2014/0245025 A1* | 8/2014 | Fairless ................. | G06F 21/602 713/189 |
| 2015/0134965 A1* | 5/2015 | Morenius ............ | H04L 63/0435 713/172 |
| 2017/0177877 A1* | 6/2017 | Suarez ................ | G06F 21/6218 |
| 2017/0244557 A1* | 8/2017 | Riel ....................... | H04L 9/0891 |
| 2019/0379579 A1* | 12/2019 | Mishra .................... | H04L 67/51 |
| 2020/0364039 A1* | 11/2020 | Gibbs ....................... | G06F 8/65 |

OTHER PUBLICATIONS

Arundel, J. et al., "Cloud Native DevOps with Kubernetes: Building, Deploying, and Scaling Modern Applications in the Cloud", O'Reilly, Compliments of NGINX, Jan. 24, 2019, XP055704783 (344 pages).

* cited by examiner

CONTAINER WITH ENCRYPTED SOFTWARE PACKAGES

CROSS REFERENCE TO RELATED APPLICATIONS

This application is a 35 U.S.C. § 371 National Stage of International Patent Application No. PCT/EP2020/059585, filed Apr. 3, 2020, which claims priority to European Patent Application No. EP 20382032.9, filed Jan. 22, 2020. The above identified applications are incorporated by this reference.

TECHNICAL FIELD

The present application relates to a method for operating a container providing a service to a user in a cloud environment, to a method for operating a decryption agent configured to support decryption of an encrypted software package, and to a method for operating a service management entity configured to manage a setup of a container providing the service to a user in the cloud environment.

Furthermore the container is provided, the decryption agent, and the service management entity. In addition a system is provided comprising at least two of these entities. Furthermore a computer program and a carrier comprising the computer program is provided.

BACKGROUND

Cloud native applications are implemented as a set of microservices. Microservices are commonly realized as a set of containers that run in a container orchestration platform (from now on, the COP). Kubernetes is an example of a COP. For each microservice type, a COP may run a varying number of microservice instances at a time to achieve redundancy and scalability. 5G Network Functions are an example of cloud native applications.

COPs use a container runtime to instantiate and run container instances. Examples of container runtimes include Docker and runc.

Container instances are instantiated from container images. Container images are stored in a container image registry and are identified with a name and a version tag. Docker Registry, Quay, JFrog Artifactory, and Consul are examples of container registries.

Container images comprise one or more filesystem layers. Each filesystem layer is identified with a message digest. A filesystem layer may be used by different container images. In runtime, layers are stacked together to create the container filesystem. Container images can be digitally signed. A COP can use the digital signature to verify the image author and the image integrity (i.e. it has not been tampered with). Digitally signed container images are not encrypted.

An image signature registry contains digital signatures for container images. When a COP fetches an image from a container image registry, it can optionally validate the signature of the image by querying the image signature registry. Docker Notary is an implementation of an image signature registry.

In many deployments, the COP is considered untrusted. This is because the COP runs in a public cloud, it is used to run other workloads, or is shared with several tenants, among other reasons.

Kubernetes Secrets are used to store moderately sensitive data. Users with the right access privileges can read Secrets and alter their contents. Although it is possible to restrict the access to Secrets to selected users, the Secret contents are commonly stored in clear in the Kubernetes database.

A secure vault is a software system that can securely store sensitive data. It is commonly used to store data that is not suitable to be stored as Kubernetes Secrets for the reasons previously mentioned. To access data stored in the vault, it is required to authenticate with the vault first.

Kubernetes Pods are the basic unit of execution. It defines one or more containers that are deployed and lifecycle managed together.

Admission Controllers is a feature of Kubernetes that allows for dynamic modification of the Pod definitions during its deployment stage. These are typically used to add artifacts to the Pod, such as containers or volumes, and to enforce cluster policies.

Binary files can be encrypted to prevent their contents from being read by unauthorized parties. Encryption is done using a key. To decrypt the file, a key must be provided. In symmetric encryption schemes, the same key is used for encryption and decryption. In asymmetric encryption schemes a key pair is used: one key is used for encryption, and the other key for decryption.

The overall problem to be solved is to provide a mechanism whereby the software package containing application files within container images cannot be reverse-engineered by unauthorized parties, such as competitors, without significant effort.

This is typically achieved by encrypting the software binaries. However, container images used by microservices of cloud native applications cannot be encrypted, as container runtimes do not support decrypting encrypted images. Proprietary solutions based on modified container runtimes challenge the portability of the cloud native applications, because the encrypted images could only be run on the same type of COP that use such container runtimes.

Solutions based on encrypting the full container image require the container runtime to decrypt the image before it can be used. The decrypted image is typically stored in a filesystem accessible by the container runtime. However, anyone or any application with access to said filesystem could access the decrypted image, thus, jeopardizing the goal.

SUMMARY

Accordingly a need exists to overcome the above-mentioned problems and to provide a system in which a container can be used together with encrypted software packages.

This need is met by the features of the independent claims. Further aspects are described in the dependent claims.

According to a first aspect, a method for operating a container is provided, the container providing a service to a user in the cloud environment, wherein the container is generated from a container image which comprises an encrypted software package. The container image, furthermore, comprises a decryption entity. According to one step of the method, a message is received to set up the container out of the container image, wherein the message comprises an access identifier allowing access to a restricted area to which the access is not provided without the access identifier, and wherein the restricted area comprises a plurality of decryption keys. The container, then, accesses the restricted area using the access identifier received with the message and retrieves a decryption key from the restricted area based on the access identifier. Furthermore, a decryption entity running within the container decrypts the encrypted software package with the retrieved decryption key in order to generate a decrypted software package, and provides the service to the user based on the decrypted software package.

Furthermore, the corresponding container is provided configured to provide the service to the user, wherein the container is operative to work as discussed above or as described in further detail below.

Alternatively, a container is provided configured to provide the service to the user in the cloud environment, wherein the container is generated from the container image which comprises an encrypted software package, wherein the container image further comprises a decryption entity. The container comprises a first module configured to receive a message to set up the container out of the container image, wherein the message comprises the access identifier allowing access to the restricted area to which the access is not provided without the access identifier, and wherein the restricted area comprises a plurality of decryption keys. Furthermore, a second module is provided configured to access the restricted area using the access identifier received with the message. A third module is provided configured to retrieve a decryption key from the restricted area based on the access identifier, and a fourth module is configured to decrypt the encrypted software package with the retrieved decryption key in order to generate a decrypted software package. Furthermore, a fifth module is configured to provide the service to the user based on the decrypted software package.

Furthermore, a method for operating a decryption agent is provided, which is configured to support decryption of an encrypted software package, in order to generate a decrypted software package used by the container, which provides the service to the user in the cloud environment. The container is generated from the container image which comprises the encrypted software package. The decryption agent receives from a container orchestration entity a service definition allowing the service to be provided by the container and the container image needed to generate the container to be identified. Furthermore, the container image is identified based on the received service definition wherein the container image comprises the encrypted software package. Furthermore, a decryption key to be used to generate the decrypted software package is determined from the encrypted software package and from a restricted area comprising a plurality of decryption keys, a generation of an access identifier is requested with which the determined decryption key stored in the restricted area can be accessed. The access to the restricted area is not provided without the access identifier. Furthermore, the decryption agent receives from the restricted area the requested access identifier and generates a new service definition based on the service definition to which the access identifier is added. Furthermore, the new service definition is transmitted back to the container orchestration entity.

Furthermore, the corresponding decryption agent is provided configured to operate as discussed above or as discussed below.

Alternatively, a decryption agent is provided configured to support the decryption of the encrypted software package in order to generate the decrypted software package used by the container which provides a service to the user in the cloud environment. The container is generated from the container image which comprises the encrypted software package. The decryption agent can comprise a first module configured to receive from the container orchestration entity a service definition allowing the service to be provided by the container and the container image needed to generate the container to be identified. A second module of the decryption agent is configured to identify the container image based on the received service definition, wherein the container image comprises the encrypted software package. A third module is configured to determine a decryption key to be used to generate the decrypted software package from the encrypted software package, and a fourth module is configured to request from the restricted area comprising a plurality of decryption keys, a generation of an access identifier with which the determined decryption key stored in the restricted area can be accessed. A fifth module is configured to receive from the restricted area the requested access identifier, and a sixth module is configured to generate a new service definition based on the service definition to which the access identifier is added. A further module, a seventh module, may be configured to transmit the new service definition back to the container orchestration entity.

Furthermore, a method for operating a service management entity is provided, which is configured to manage a setup of a container providing the service to the user in the cloud environment, wherein the container is generated from the container image which comprises an encrypted software package. The service management entity stores the container image of a plurality of containers in a container image registry. Furthermore, it stores a decryption key configured to decrypt the encrypted software package in a restricted area which comprises a plurality of decryption keys and wherein the access to the restricted area is not provided without an access identifier. Furthermore, the service management entity requests a container registration entity to configure a decryption agent such that the decryption agent is able to map the decryption key to the container image comprising the encrypted software package.

Furthermore, the corresponding service management entity is provided configured to operate as described above or as discussed in further detail below.

Alternatively, the service management entity comprises a first module configured to store the container image of all containers in a container image registry. Furthermore, a second module is provided configured to store a decryption key configured to decrypt the encrypted software package in a restricted area which comprises a plurality of decryption keys and wherein the access to the restricted area is not provided without an access identifier. A third module is configured to request a container registration entity to configure a decryption agent, such that the decryption agent is able to map the decryption key to the container image comprising the encrypted software package.

Additionally, a system is provided comprising at least two entities from a group comprising the container, the decryption agent and the service management entity as discussed above.

Additionally, a computer program comprising program code is provided wherein execution of the program code causes at least one processing unit of the container, the decryption agent, or the service management entity to execute a method as discussed above or as explained in further detail below.

Additionally, a carrier comprising the computer program is provided, wherein the carrier is one of an electronic signal, optical signal, radio signal, or computer readable storage medium.

It is to be understood that the features mentioned above and features yet to be explained below can be used not only in the respective combinations indicated, but also in other combinations or in isolation, without departing from the scope of the present invention. Features of the above-mentioned aspects and embodiments described below may be combined with each other in other embodiments unless explicitly mentioned otherwise.

BRIEF DESCRIPTION OF DRAWINGS

The foregoing and additional features and effects of the application will become apparent from the following detailed description when read in conjunction with the accompanying drawings in which like reference numerals refer to like elements.

DETAILED DESCRIPTION OF DRAWINGS

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components of physical or functional units shown in the drawings and described hereinafter may also be implemented by an indirect connection or coupling. A coupling between components may be established over a wired or wireless connection. Furthermore, functional blocks may be implemented in hardware, software, firmware, or a combination thereof.

As will be discussed below, the present invention overcomes the above-mentioned problems by creating a container image which comprises two parts, a first part or base layer which contains the operating system and a decryption entity, and a second part or an application layer which contains an encrypted software package of software binaries.

When instantiating a container instance from the container image, the decryption entity is run and this decryption entity can access a secure vault to retrieve a decryption key. The secure vault can be essentially deployed in a cloud. The decryption entity can, furthermore, use the decryption key to decrypt the encrypted software package into a volatile file system that the container instance mounts and uses as a regular file system. The decryption entity furthermore runs the corresponding software binary.

Furthermore, the solution discussed below uses a decryption agent that intercepts the container instantiation requests in the container orchestration platform that use container images with encrypted software packages. The decryption agent can furthermore create a one-time access identifier or token in the vault which enables the retrieval of the decryption key. The decryption agent can furthermore provide the one-time token to the decryption entity during the container initialization.

Figure 1:
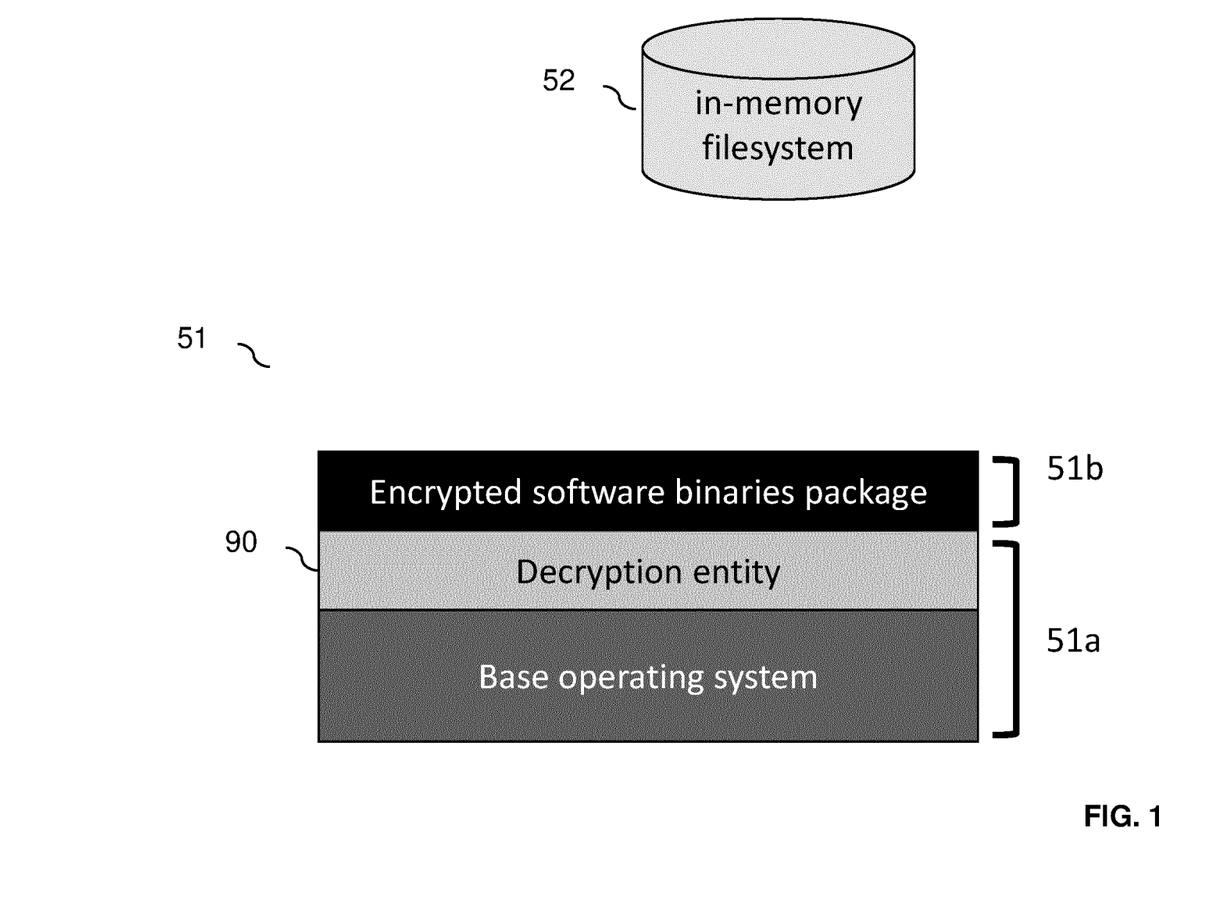
FIG. 1 shows a schematic view of a container image comprising an encrypted software package and a decryption entity configured to decrypt the encrypted software package.

FIG. 1 shows a file system 52 comprising a decrypted software package, which can be generated from a container image as shown in the lower part of FIG. 1. As shown, the container image 51 comprises a base layer 51a which is generally common to all contain images of the application. It can contain a base operating system that provides the basic system binaries, libraries and configuration files. However it is also possible that the container does not include a base operating system if it is not needed by the application.

A decryption entity 90 in the base layer can be a software application that can read an encrypted software package, can decrypt it, can unpack its content into of a file system, and can run a selected software from it. Several encryption techniques may be used, providing that all of them require some form of key for decryption and the decryption becomes too complex without the decryption key. The decryption keys can be symmetric, asymmetric, or of any other type.

The contents of the base layer or first part 51a are not relevant from a protection perspective and therefore do not have to be encrypted. The goal is to protect the contents of the application layer 51b from being reverse-engineered.

The application layer or second part 51b is unique to every or each container image. It contains the encrypted software package, also called encrypted package hereinafter. This encrypted package comprises a representation of the file system of the application binaries. An example of the encrypted software package is a file in a "tar" format, optionally compressed with "gzip" and encrypted using the corresponding encryption technique and key. Although the term binaries is used, other file types such as scripts, text files, etc., can be part of the encrypted software package. The decryption entity is used to decrypt the encrypted software package.

To create the container images, the application providing the service should be generated by using an encryption tool that generates an encrypted version of the application software suitable to be decrypted by a decryption entity.

An example procedure for creating a container image is discussed below:

In a first step an encryption key or a key pair is created depending on the used encryption scheme.

The application software is then compiled, and a package of the application software is generated.

The encryption entity is used to create the encrypted package by encrypting the application software using the encryption key resulting in the creation of the application layer 51*b*.

The container image is then generated by arranging the base layer, the application layer and the decryption entity altogether. The container image is then configured to run the decryption entity as default executable binary.

Furthermore the container image is distributed and the decryption key is also distributed as discussed below.

Accordingly one aspect of the invention is the arrangement of a decryption entity and the encrypted software package into a container image.

Figure 2:
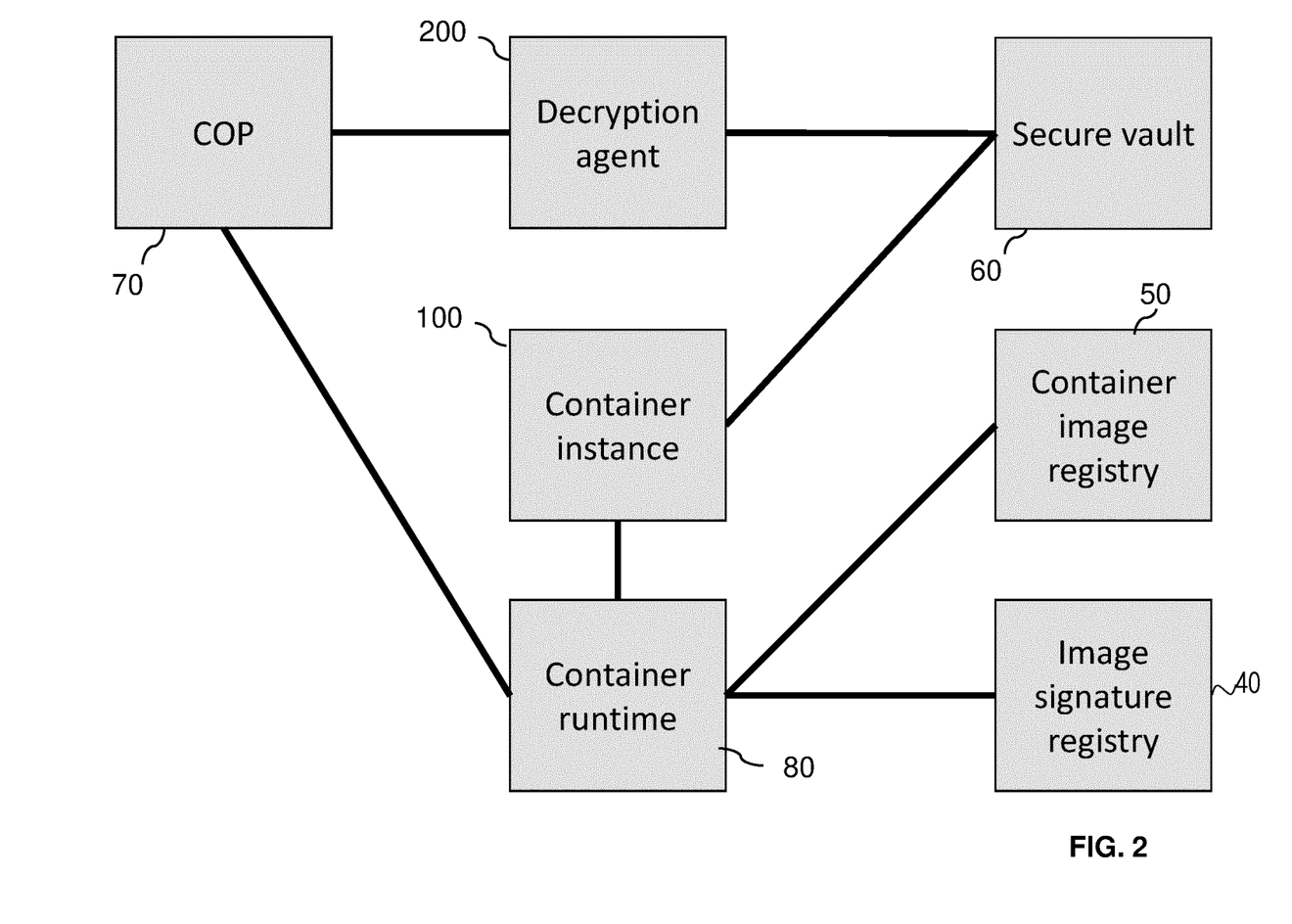
FIG. 2 shows an example schematic architectural view of a system in which a container instance is generated based on a container image as shown in FIG. 1.

FIG. 2 shows a schematic view of the architecture of the invention. A Container Orchestration Platform 70, COP, manages the lifecycle of the container instances 100 wherein only a single container instance is shown in the Figure. However, it should be understood that several of these container instances 100 are provided to provide a certain service. Examples of services include an application frontend, or a database management service. The container instances are created as a result of a user request, or as a result of a scaling decision, among others. For the illustration of the present application the COP may be based on Kubernetes. The container instances may be modeled as PODs. The POD manifest is a descriptor that captures all the attributes of the container instances.

The decryption agent 200 configures the container instances to support the decryption of the encrypted package during instantiation. The decryption agent 200 receives from the COP the descriptors of the micro service instances to be instantiated, adds the required amendments, such as the generation of a new storage area, and returns the modified descriptor to the COP. The decryption agent 200 may be implemented as an admission controller.

Furthermore, a secure vault 60 is provided, which provides secure storage, retrieval, and management of decryption keys. An access to the decryption keys stored in the vault is granted, using preferably, but not exclusively, one time access tokens or access identifiers.

The container image registry 50 provides storage and retrieval of container images. The image signature registry 40 provides signature verification of container images. A container instance 100 is a container image run by a container runtime 80.

The architecture shown may comprise different and additional interfaces between the involved components. For the sake of clarity, only those relevant for the understanding of the invention have been shown.

Figure 3:
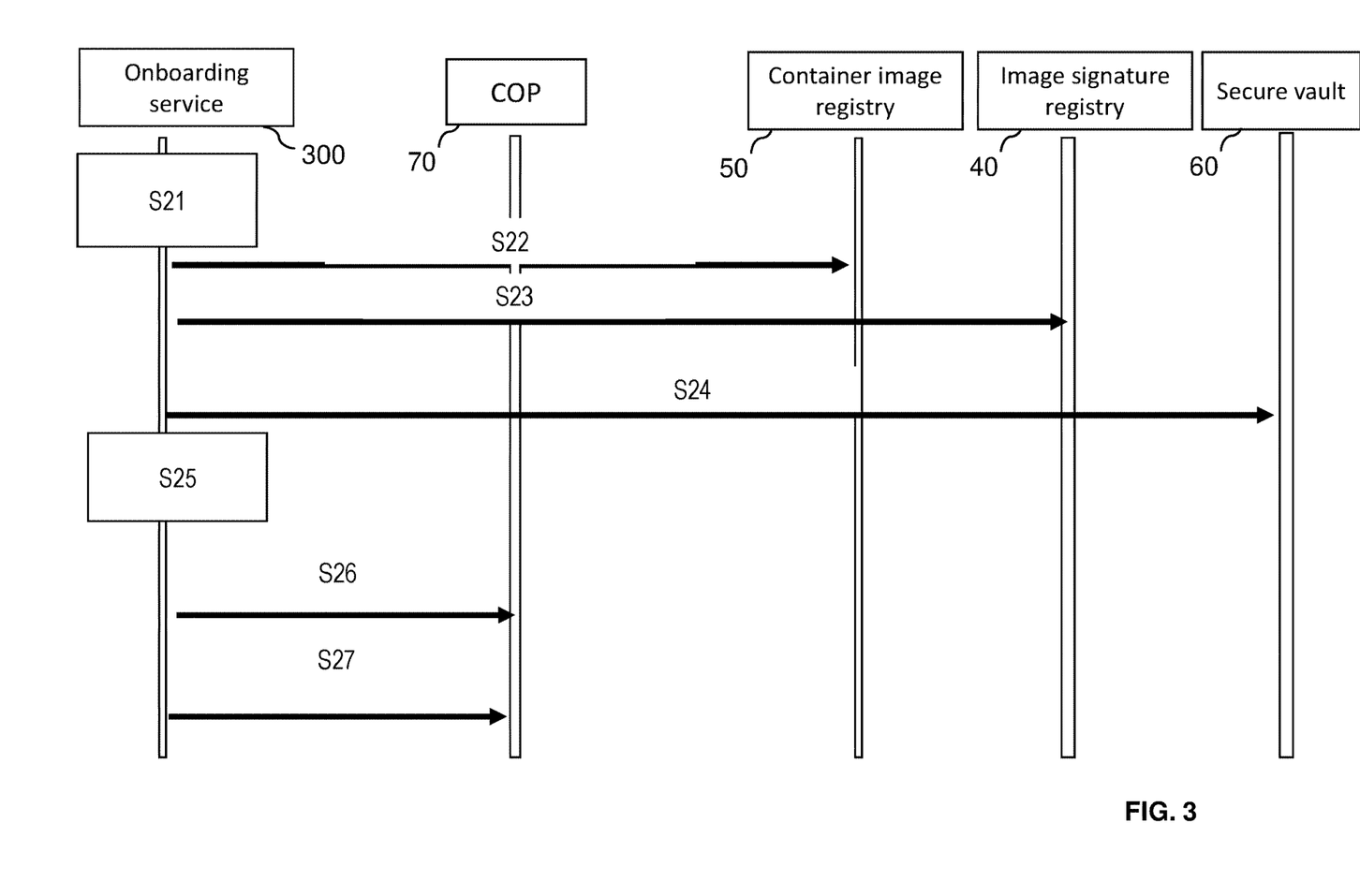
FIG. 3 shows an example schematic representation of a message exchange between the involved entities shown in FIG. 2 to set up the container image as shown in FIG. 1.

FIG. 3 shows how the container image is instantiated. In a step S21 the onboarding service is used to deploy the cloud native applications. The onboarding service can be an orchestration system, an installation tool, a human operator, etc., and is also called service management entity hereinafter.

The onboarding service 300 then processes all the container images used by the application. In step S22 the onboarding service then stores each container image in the container image registry 50. If signature verification is to be used, it stores the container image signatures in the image signature registry 40 as shown by step S23. Furthermore, the onboarding service stores the decryption key needed to decrypt the container image in the secure vault as shown by step S24.

When all the container images have been processed, the onboarding service instantiates the application in step S25. It first deploys the decryption agent 200 in step S26 which is configured with all the container images to decryption key mappings. In step S27 the container service deploys the different application objects.

Figure 4:
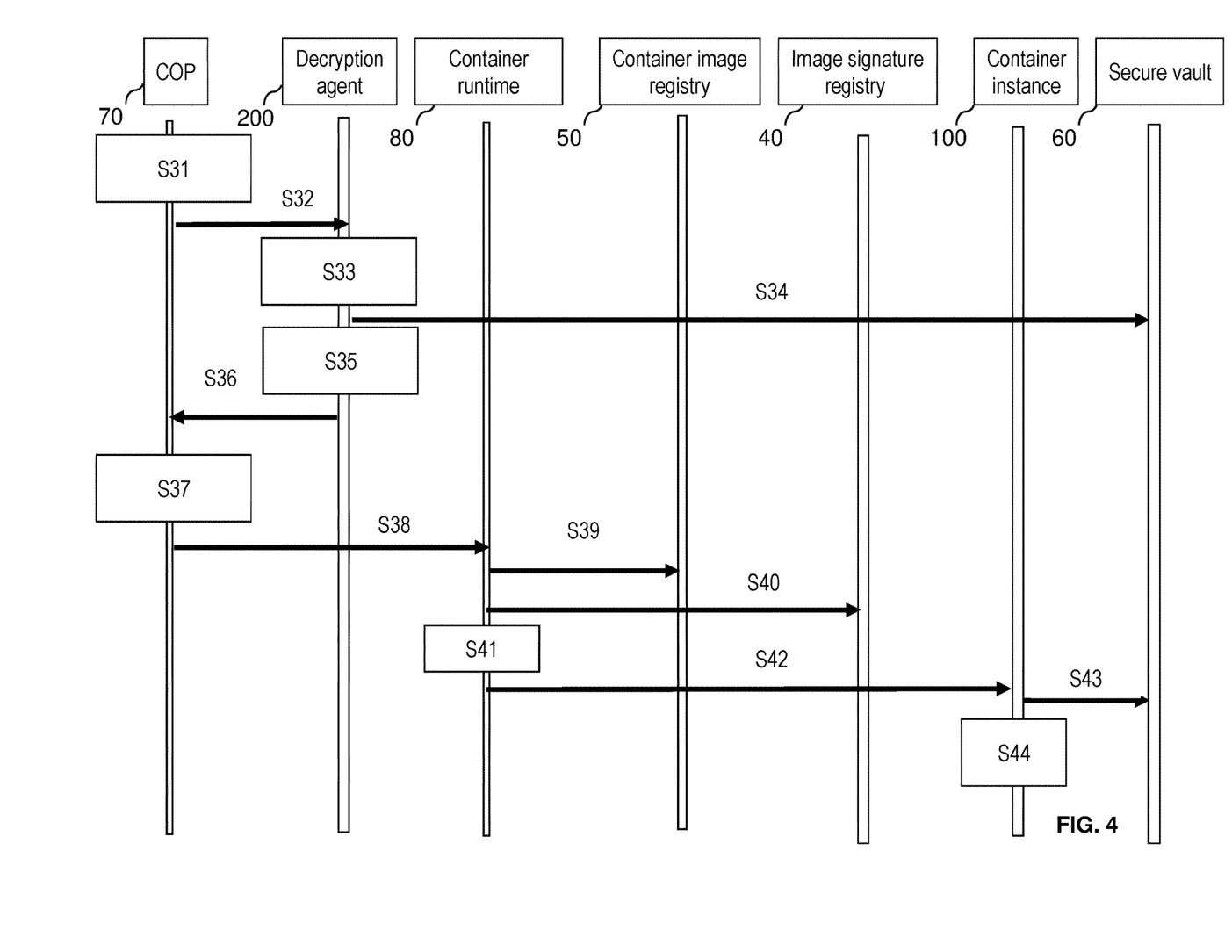
FIG. 4 shows an example schematic representation of a message exchange between the involved entities how a service is instantiated based on the encrypted container image as shown in FIG. 1.

FIG. 4 now shows how the container instances are instantiated for the cloud native application.

The COP 70 determines in step S31 the need to instantiate a new microservice instance and processes the definition of the microservice instance. As with any other admission controller, the COP sends the microservice instance definition to the decryption agent 200 in step S32 for further processing. The decryption agent 200 inspects the microservice instance definition and identifies the container images to be used. For each container image it determines the decryption key to use in step S33, using a mapping provided at deployment time. For each key, it requests the secure vault 60 to create a one-time token to access it as shown by step S34. The decryption agent 200 modifies the service definition in step S35 in the following way:

It injects the one-time token into the container instance definition. This can be done using an environment variable, a configuration file, or any other method supported by the COP.

Furthermore, it creates an empty volatile file system attached to the container image.

A volatile file system can be implemented by different means depending on the COP capabilities.

The requirements that a volatile file system implementation are preferably met by the following:

No persistent data are stored to any persistent storage such as a disk or network storage.

Furthermore, the file system should not survive a rebooting of the corresponding node where it is stored.

Furthermore, the file system should be private to the container instance.

These features may be provided, but are not necessarily provided.

The COP may be a memory-based temporary file system, TMP FS which is an example of a volatile file system that fulfills the above mentioned requirements.

The decryption agent 200 in step S36 sends back the updated microservice definition to the COP, wherein the latter schedules it to a node of the cluster in step S37 and requests a container runtime 80 to instantiate the container as shown by step S38. The container runtime 80 retrieves the container images from the corresponding container image registry 50 in step S39. If signature verification is to be used, the container runtime 80 fetches the image signatures from the image signature registry 40 in step S40 and validates the container images against them. The container runtime 80 instantiates all the containers in step S41 and runs the decryption entity 90 of the container image 51 in step S42 as it is configured as default executable for the container images.

The decryption entity 90 reads the injected one-time token and presents it to the secure vault 60 in step S43 in order to retrieve the decryption key. The secure vault 60 validates the one-time token, returns the decryption key to the decryption entity 90 and invalidates the one-time token/access identifier, consequently preventing it from being used in subsequent requests. The decryption entity 90 uses the decryption key to decrypt the encrypted software package in step S44.

The decryption entity 90 uses the volatile file system as destination for the decrypted content. When the encrypted software package contents are stored decrypted in the volatile file system, the decryption entity runs the corresponding application software and terminates.

In the event of a container instance restart, which would require the container instance to re-run the decryption tool as the volatile memory is cleared, an issue raises: since the one-time token is no longer usable, as the secure vault has invalidated it, the container instance does not have a valid one-time token for retrieving the decryption key. To overcome this issue, it is required to configure the microservice instance so that, when a container instance is terminated, the COP terminates the microservice instance and prevents a restart of such a container instance. Instead of a restart, the COP creates a new instance of the microservice, meaning that the COP starts the process again in step S31 using a new instance. By way of example this may be achieved by setting a restart policy of "never restart" in the POD definition.

Figure 5:
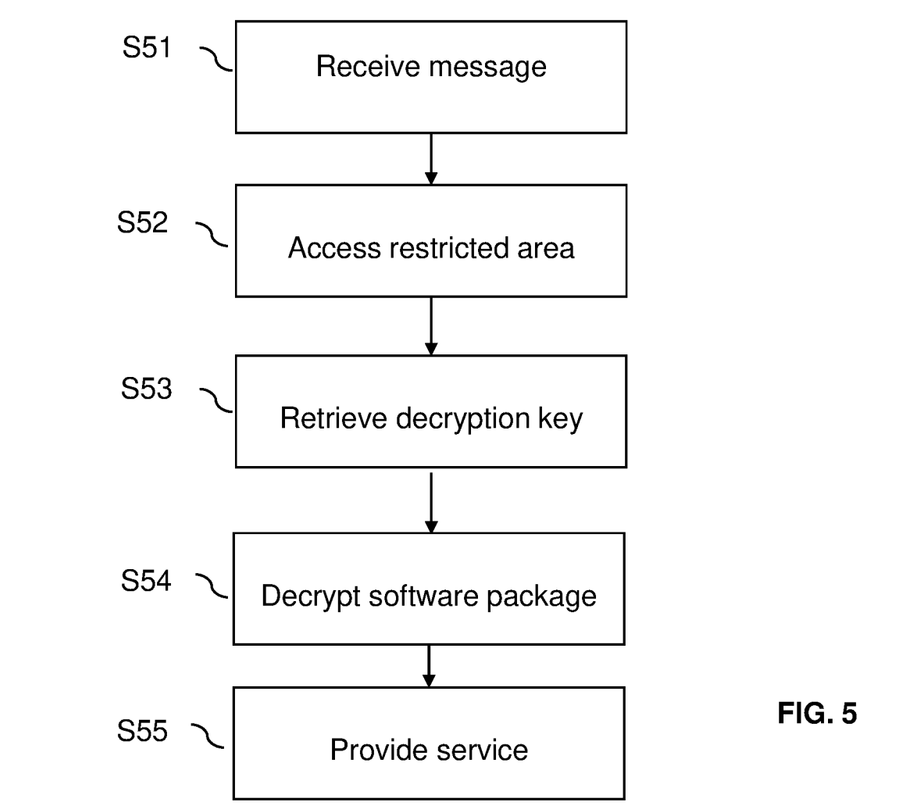
FIG. 5 shows an example flowchart of a method carried out at the container configured to provide the service to the user in a cloud environment with a container image comprising an encrypted software package.

FIG. 5 summarizes some of the steps carried out at a container instance 100 in the above-identified and described method. In step S51 the container instance 100 receives a message to set up the container out of the container image, wherein the container instance 100 comprises the access identifier or one-time token to access the secure vault 60. This was discussed above in connection with FIG. 4 in step S42. In step S52 the container instance 100 then accesses the restricted area, such as the secure vault 60 using the access identifier received with the message, and retrieves the decryption key from this restricted area in step S53 and, as discussed above, in connection with FIG. 4, step S43. In step S54 the container instance 100 decrypts the software package using the retrieved key, and provides the service in step S55 using the decrypted software package.

Figure 6:
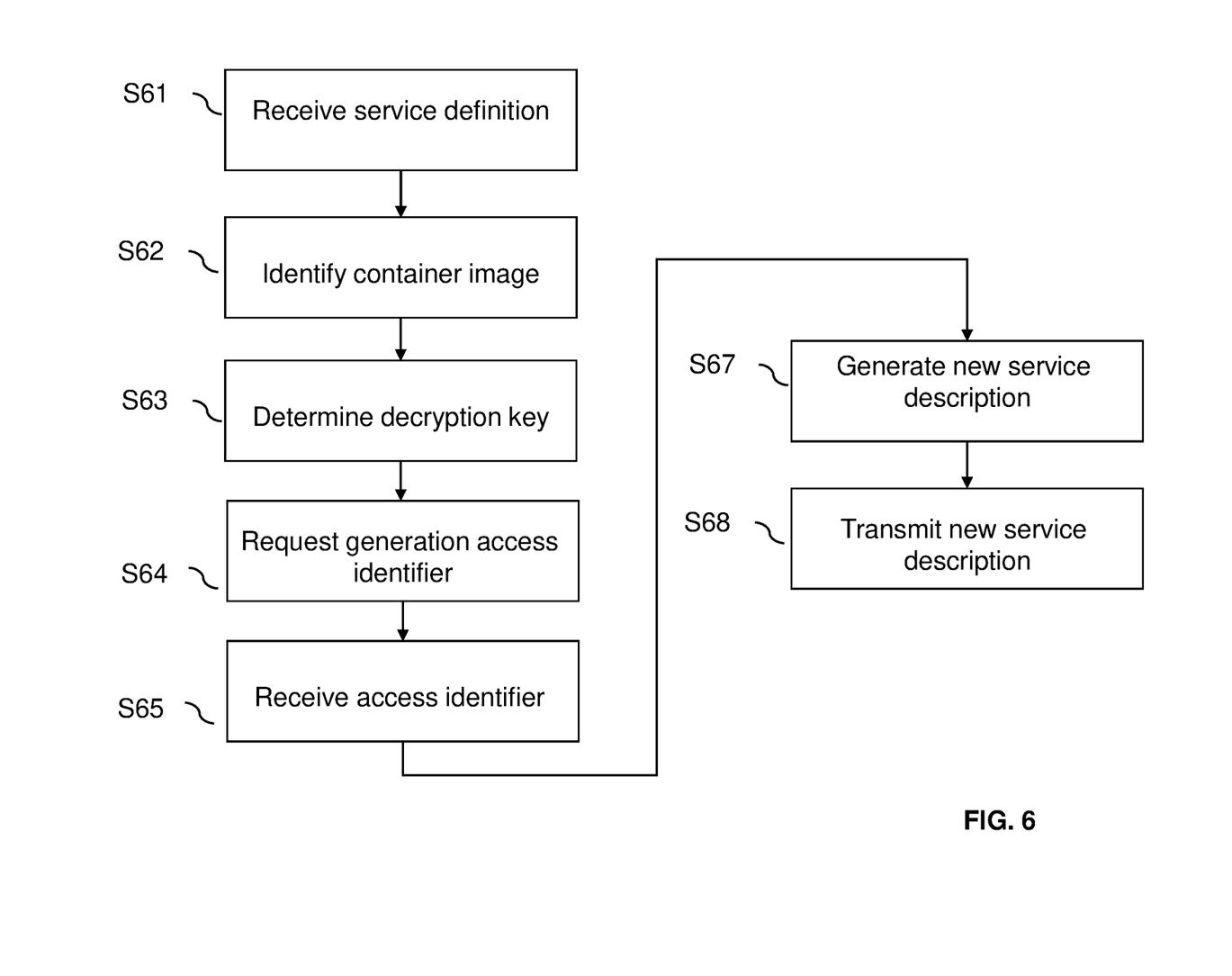
FIG. 6 shows an example schematic flowchart of a method carried out at a decryption agent shown in FIG. 2 supporting the decryption of the encrypted software package.

FIG. 6 summarizes the steps carried out at the decryption agent 200. In step S61 the decryption agent 200 receives the service definition, as discussed above in connection with step S32. In step S62, it identifies the container image based on the received service definition, and in step S63 it determines a decryption key to be used to generate the decrypted software package from the encrypted software package. In step S64 it requests from the secure vault the generation of the access identifier with which the decryption key can be accessed, as discussed above in connection with step S34. In step S65 the access identifier is received from the secure vault, and in step S67 a new service definition is generated based on the service definition to which the access identifier is added. In step S68 a new service definition is then transmitted back to the container orchestration entity. This was discussed above in connection with step S36.

Figure 7:
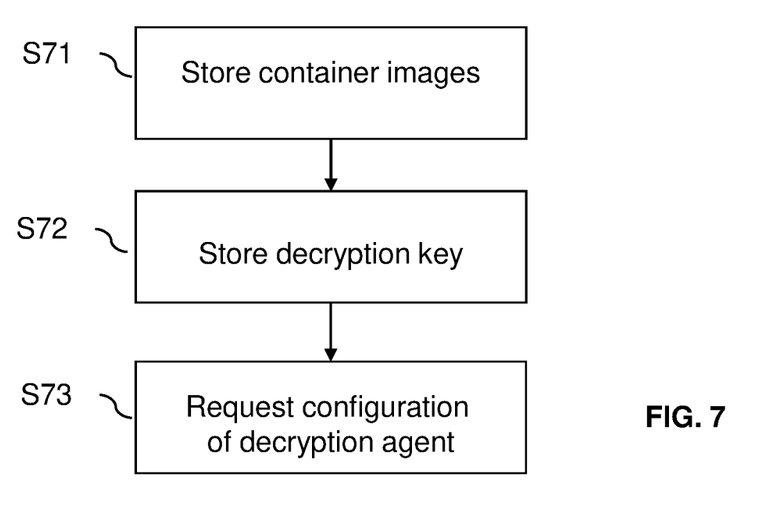
FIG. 7 shows an example flowchart of a method carried out at the service management entity configured to manage a setup of the container.

FIG. 7 summarizes the steps carried out at a service management entity 300 such as the onboarding service as discussed above in connection with FIG. 3. In step S71 it stores the container images of all containers in a container image registry as discussed above in FIG. 3 in step S22. Furthermore, in step S72 it stores a decryption key configured to decrypt the encrypted software package in the restricted area as discussed above in step S24. Furthermore, it requests the container registration entity to configure a decryption agent 200 such that the decryption agent is able to map the decryption key to the container image comprising the encrypted software package, as discussed above in connection with step S26.

Figure 8:
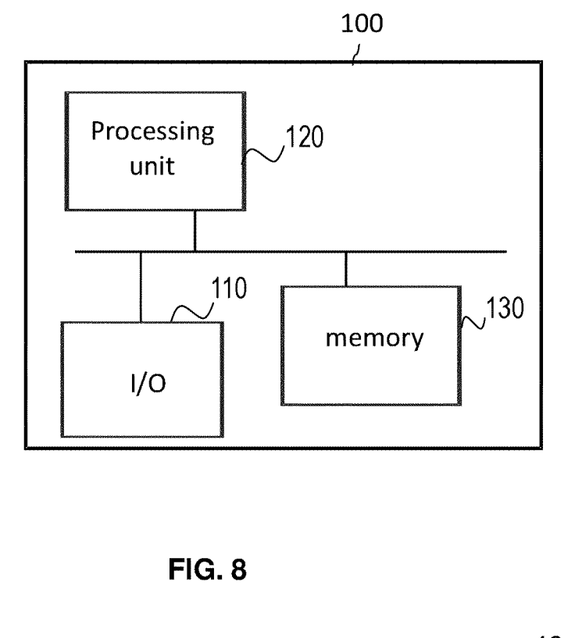
FIG. 8 shows an example schematic representation of a container configured to use an encrypted software package.

FIG. 8 shows a schematic view of a container instance 100 providing the service to the user. The container instance can operate as discussed above, can use a decryption key to generate a decrypted software package from the encrypted software package, and can provide the service to the user as requested. The container instance 100 comprises an interface 110 which is provided for transmitting user data or control messages to other entities such as the entities shown in FIGS. 2 to 4. The interface 110 is furthermore configured to receive control messages or user data from other entities. The container 100 furthermore comprises a processing unit 120 which is responsible for the operation of the container 100. The processing unit 120 can comprise one or more processors and can carry out instructions stored on a memory 130, wherein the memory may include a read-only memory, a random access memory, a mass storage, a hard disk, or the like. The memory can furthermore include suitable program code to be executed by the processing unit 120, so as to implement the above described functionalities of the container instance.

The container instance, the decryption agent, or the service management entity may be provided in a cloud environment, so that the corresponding processing units or the memories may be distributed over different locations in the cloud.

Figure 9:
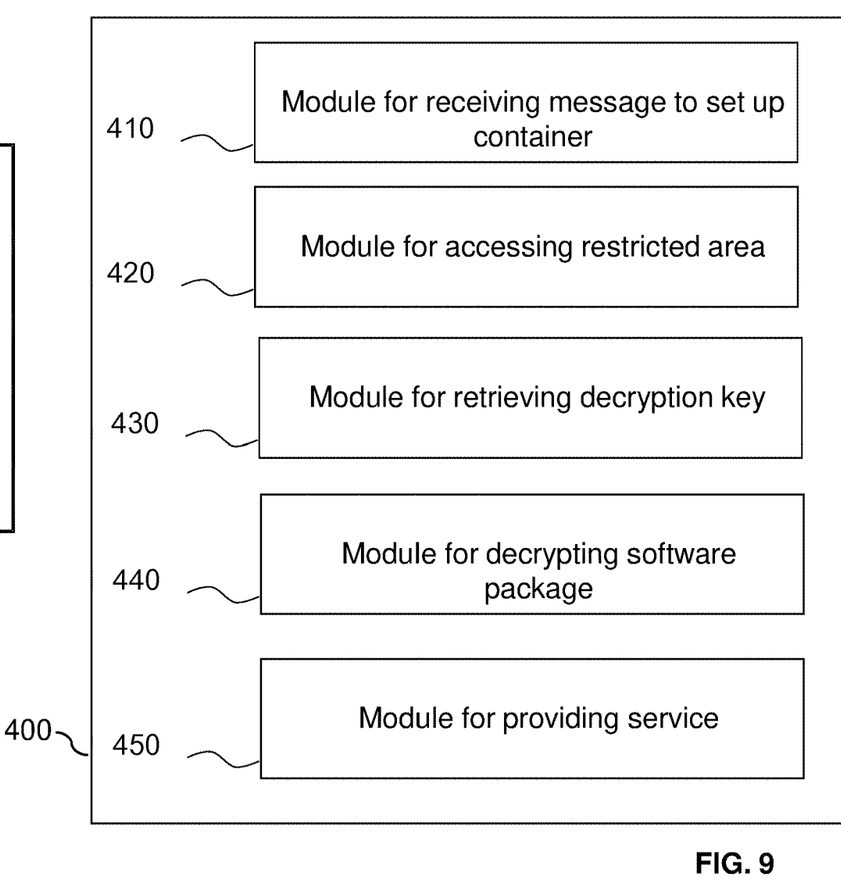
FIG. 9 shows another example schematic representation of the container configured to use the encrypted software package.

FIG. 9 shows a further embodiment of a container 400 comprising a first module 410 configured to receive a message to set up the container out of the container image, wherein the message comprises the access identifier, allowing the access to the secure vault. Furthermore, a second module 420 is provided configured to access the secure vault using the access identifier, and a module 430 is provided configured to retrieve the decryption key from the secure vault. A module 440 is provided configured to decrypt the software package with the retrieved decryption key, and finally, module 450 is provided configured to provide the service based on the decrypted software package.

Figures 10, 11:
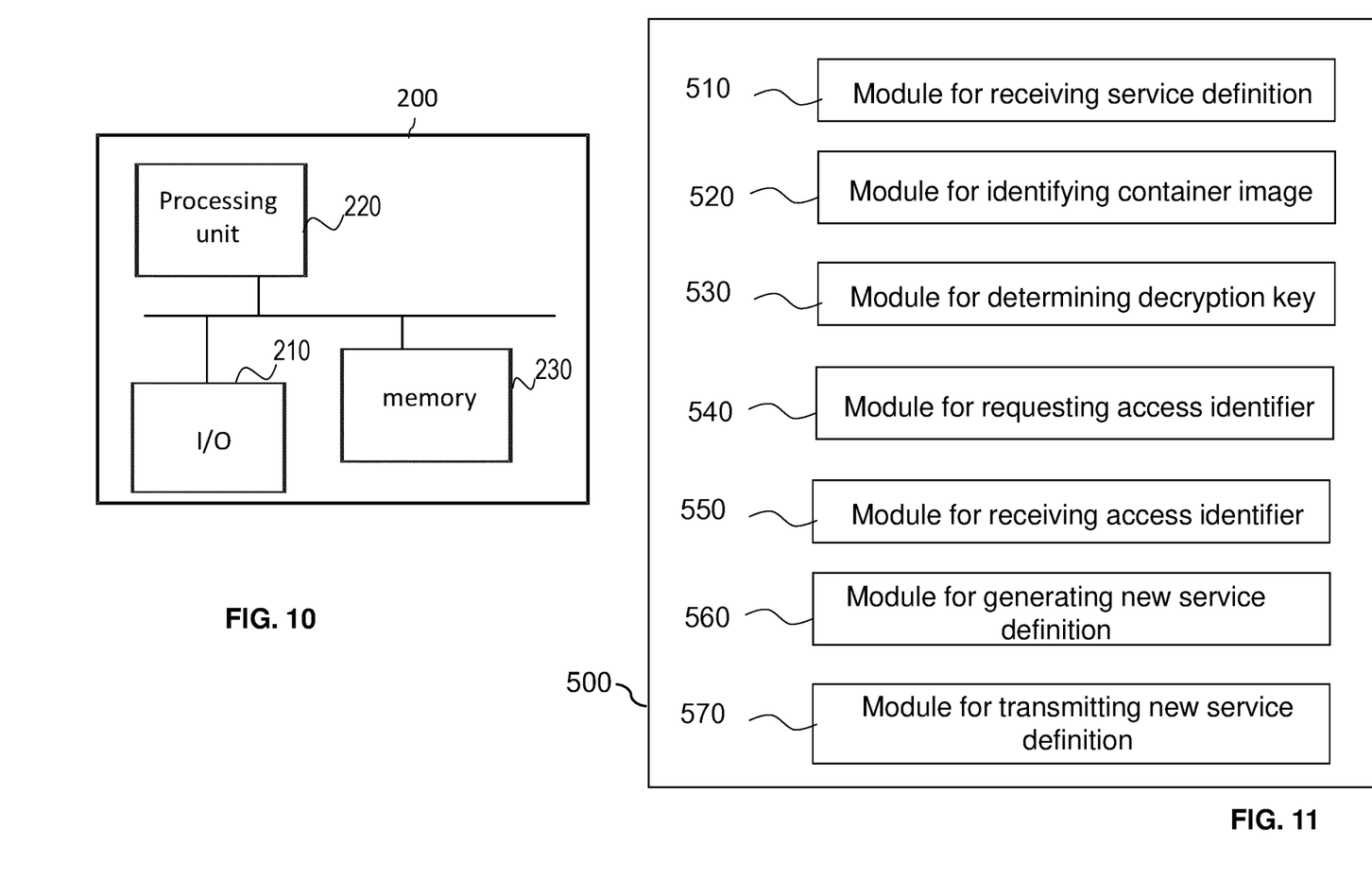
FIG. 10 shows an example schematic representation of a decryption agent configured to support the decryption of an encrypted software package.
FIG. 11 shows an example schematic representation of a further decryption agent configured to support the decryption of an encrypted software package.

FIG. 10 shows an example schematic view of the decryption agent 200, which can operate as discussed above, especially in connection with FIG. 4.

The decryption agent 200 comprises an interface 210 configured to transmit user data or control messages to other entities, and configured to receive user data and control messages from other entities. The decryption agent, furthermore, comprises a processing unit 220 which is responsible for the operation of the decryption agent 200. The processing unit 220 can comprise one or more processors and can carry out instructions stored on a memory 230, wherein the memory may include a read-only memory, a random access memory, a mass storage, a hard disk, or the like. The memory 230 can, furthermore, include suitable program code to be executed by the processing unit 220, so as to implement the above described functionalities in which the decryption agent is involved.

FIG. 11 shows another example schematic representation of a decryption agent comprising a first module 510 configured to receive the service definition, allowing the service to be provided by the container, and allowing the container image to be identified. A module 520 is provided configured to identify the container image based on the received service definition, wherein the container image comprises the encrypted software package.

Module 530 is provided configured to determine the decryption key to be used to generate the decrypted software package from the encrypted software package, and module 540 is configured to request the access identifier from the restricted area, wherein the generation of the access identifier is requested. Module 550 is provided configured to receive from the restricted area the requested access identifier, and module 560 is configured to generate the new service definition based on the service definition to which the access identifier is added. Module 570 is configured to transmit the new service definition back to the container orchestration entity.

Figure 12:
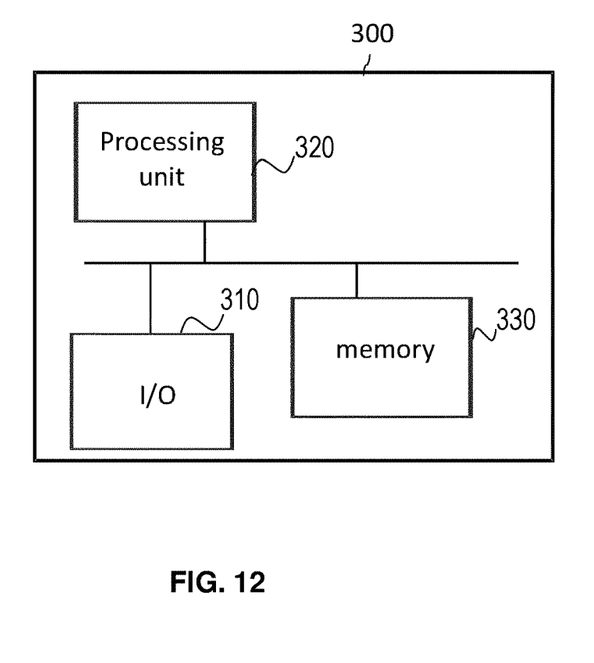
FIG. 12 shows an example schematic representation of a service management entity configured to manage the setup of the container.

FIG. 12 shows an example schematic view of a service management entity 300 configured to manage the setup of the container, as discussed in connection with FIG. 3. The service management entity comprises an interface 310 configured for transmitting user data and control messages, and configured to receive user data and control messages from other entities. The service management entity 300, furthermore, comprises a processing unit 320, which is responsible for the operation of the service management entity. The processing unit 320 can comprise one or more processors, and can carry out instructions stored on a memory 330. The memory may include a read-only memory, a random access memory, a mass storage, a hard disk, or the like. The memory 330 can, furthermore, include suitable program code to be executed by the processing unit 320, so as to implement the above described functionalities in which the service management entity 300 is involved.

Figure 13:
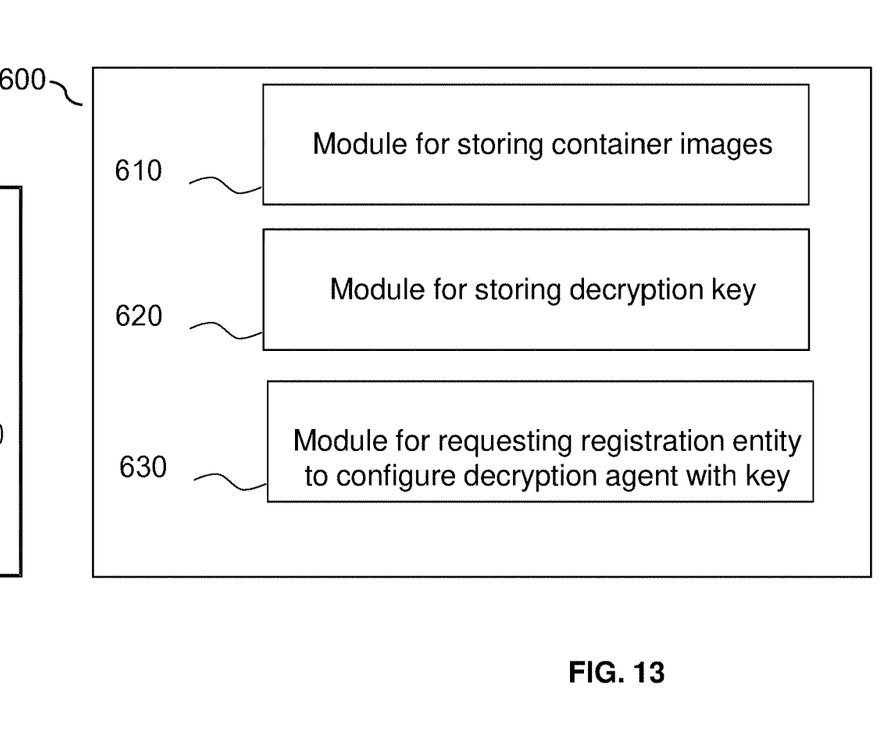
FIG. 13 shows another example schematic representation of the service management entity configured to manage the setup of the container.

FIG. 13 shows another example configuration of such a service management entity 600 comprising a first module 610 configured to store the container images of the containers in the container image registry. Module 620 is provided configured to store also the decryption key configured to decrypt the encrypted software package in the restricted area. A module 630 is provided configured to request the container registration entity to configure a decryption agent, such that the decryption agent is able to map the decryption key to the container image comprising the encrypted software package.

From the above said some general conclusions can be drawn (here we summarize the dependent claims).

As far as the container instance is concerned the access identifier, which is present in the message received by the container, can be a one-time access identifier, allowing only a single access to the restricted area. With this single access, it can be made sure that the same access identifier is not used a second time in order to decrypt the encrypted software package.

The one-time access identifier can be a one-time token.

Furthermore, it is possible that in the container image, the encrypted software package is stored in one layer of the container image, whereas the decryption entity configured to decrypt the encrypted software package is stored in another layer of the container image.

The restricted area may be a secure vault as discussed above.

As far as the decryption agent 200 is concerned, the requested access identifier, which is requested from the restricted area, can be requested as a one-time access identifier, allowing only a single access to the restricted area.

Furthermore, the decryption key may be determined based on the identified container image, wherein the container image was identified based on the received service definition.

When a new service definition is generated, it is possible to create a new storage area into which the decrypted software package is to be inserted. This storage area may be created such that one of the following conditions is met:

The storage area cannot be stored in a persistent storage part.

The storage area does not survive a reboot of the container, and is, furthermore, private to the container.

As discussed above, the proposed solution provides a method for running a cloud native application in an untrusted platform using encrypted software packages, without requiring a custom container runtime that would challenge application portability across different COPs. The unauthorized decryption is hardly possible, as a one-time token is used to retrieve the decryption key from the secure vault. Furthermore, the access to the decrypted image is prevented due to the fact that a volatile file system is used, which is accessible only by the container instance.

The volatile file system can guarantee that only the container instance itself can access the decrypted package. This can make it very complicated for unauthorized parties to retrieve the decrypted software package.

Accordingly, the above described method makes it harder for an unauthorized party to access sensitive application software by the following aspects:

The software package is encrypted within the container image, making it very difficult to decrypt it without any decryption key. The decryption key is stored in an area with limited access, which prevents parties without access to the vault to retrieve it. By using the one-time token to retrieve the decryption key, it is hardly possible to use replay attacks. Additional access control methods provided by the secure vault implementation could be combined to further increase the security. By injecting the token by the decryption agent at the instantiation, the one-time token has not to be provided or exposed beforehand. With the use of the volatile private file system for storing the unencrypted software packages, it can be prevented that unauthorized parties will access the node and the file system to read them.

The invention claimed is:

1. A method for protecting an unencrypted version of a software package from unauthorized access, wherein a container image comprises i) a decryption entity (DE) and ii) an encrypted version of the software package, the method comprising:

instantiating a container from the container image comprising the decryption entity and the encrypted version of the software package, wherein the container is configured to automatically launch the decryption entity at the time container is instantiated;

upon being launched, the decryption entity obtaining an access identifier allowing access to a restricted area, the restricted area comprising a plurality of decryption keys;

the decryption entity accessing the restricted area using the access identifier;

the decryption entity retrieving a decryption key from the restricted area based on the access identifier;

the decryption entity decrypting the encrypted version of the software package with the retrieved decryption key in order to generate the unencrypted version of the software package; and providing the service to the user using the unencrypted version of the software package.

2. The method of claim 1, wherein the access identifier is a one-time access identifier allowing only a single access to the restricted area.

3. The method of claim 2, wherein the one-time access identifier is a one-time token.

4. The method of claim 1, wherein
the encrypted software package is stored in a first layer of the container image, and
the decryption entity configured to decrypt the encrypted software package using the retrieved decryption key is stored in a second layer of the container image, wherein the second layer is not the first layer.

5. The method of claim 1, wherein the restricted area is a secure vault.

6. A method for operating a decryption agent configured to support decryption of an encrypted software package in order to generate a decrypted software package used by a container providing a service to a user in a cloud environment, wherein the container is generated from a container image which comprises the encrypted software package, the method comprising:
receiving, from a container orchestration entity, a service definition allowing the service to be provided by the container and the container image needed to generate the container to be identified;
identifying the container image based on the received service definition, the container image comprising the encrypted software package;
determining a decryption key to be used to generate the decrypted software package from the encrypted software package;
requesting from a restricted area comprising a plurality of decryption keys, a generation of an access identifier with which the determined decryption key stored in the restricted area can be accessed, wherein the access to the restricted area is not provided without the access identifier;
receiving, from the restricted area, the requested access identifier;
generating a new service definition based on the service definition to which the access identifier is added; and
transmitting the new service definition back to the container orchestration entity.

7. The method of claim 6, wherein the requested access identifier is requested as one time access identifier allowing only a single access to the restricted area.

8. The method of claim 6, wherein the decryption key is determined based on the identified container image.

9. The method of claim 6 wherein
generating the new service definition comprises creating a storage area into which the decrypted software package is to be inserted, and
the storage area is created such that at least one of the following conditions is met: the storage area cannot be stored in a persistent storage, the storage area does not survive a reboot of the container, or the storage area is private to the container.

10. A method for operating a service management entity configured to manage a set-up of a container providing a service to a user in a cloud environment, wherein the container is generated from a container image which comprises an encrypted software package, the method comprising:
storing the container image in a container image registry;
storing, in a restricted area, a decryption key for use in decrypting the encrypted software package, the restricted area storing a plurality of decryption keys, wherein access to the restricted area is not provided without an access identifier; and
providing to a decryption agent mapping information that maps a container image identifier for identifying the container image with a decryption key identifier for identifying the decryption key for use in decrypting the encrypted software package.

11. A system comprising:
memory;
processing circuitry, wherein the system is configured to perform the method of claim 1.

12. The container of claim 11, wherein the access identifier is a one-time access identifier allowing only a single access to the restricted area.

13. The container of claim 11, wherein
the encrypted software package is stored in a first layer of the container image, and
the decryption entity configured to decrypt the encrypted software package using the retrieved decryption key is stored in a second layer of the container image, wherein the second layer is not the first layer.

14. A decryption agent configured to support decryption of an encrypted software package in order to generate a decrypted software package used by a container providing a service to a user in a cloud environment, wherein the container is generated from a container image which comprises the encrypted software package, the decryption agent comprising;
memory storing a computer program; and
processing circuitry for executing the computer program for configuring the service management entity to perform the method of claim 6.

15. The decryption agent of claim 14, further being operative to request the requested access identifier as one time access identifier allowing only a single access to the restricted area.

16. The decryption agent of claim 14, further being operative to determine the decryption key based on the identified container image.

17. The decryption agent of claim 14, further being operative, for generating the new service definition, to create a storage area into which the decrypted software package is to be inserted.

18. The decryption agent of claim 17, further being operative, to create the storage area such that at least one of the following conditions is met:
the empty file cannot be stored in a persistent storage,
does not survive a reboot of the container,
is private to the container.

19. A service management entity configured to manage a set-up of a container providing a service to a user in a cloud environment, wherein the container is generated from a container image which comprises an encrypted software package, the service management entity comprising;
memory storing a computer program; and
processing circuitry for executing the computer program for configuring the service management entity to perform the method of claim 10.

20. A non-transitory computer readable storage medium storing a computer program comprising program code to be executed by at least one processing unit of a container, of a decryption agent entity or of a service management entity wherein execution of the program code causes the at least one processing unit to execute the method of claim 1.

* * * * *